United States Patent [19]

Staniulis et al.

[11] Patent Number: 5,013,703

[45] Date of Patent: May 7, 1991

[54] NOBLE METAL EXCHANGE OF HYDROPHOBIC MOLECULAR SIEVES

[75] Inventors: Mark T. Staniulis, Peekskill; Douglas E. Crozier, Yonkers, both of N.Y.; Alan P. Risch, New Fairfield; Jenny L. Pai, Brookfield, both of Conn.

[73] Assignee: UOP, Des Plaines, Ill.

[21] Appl. No.: 402,745

[22] Filed: Sep. 5, 1989

[51] Int. Cl.$^5$ ............... B01J 21/08; B01J 23/38
[52] U.S. Cl. .................. 502/241; 502/243; 502/261
[58] Field of Search ........... 502/261, 66, 241, 243; 423/580, 648

[56] References Cited

U.S. PATENT DOCUMENTS

| | | | |
|---|---|---|---|
| 2,690,379 | 9/1954 | Urey et al. | 502/261 |
| 3,668,148 | 6/1972 | Van Beek et al. | 502/261 |
| 3,894,965 | 7/1975 | Foster et al. | 502/261 |
| 4,061,724 | 12/1977 | Grose et al. | 423/335 |
| 4,420,420 | 12/1983 | Mita et al. | 502/261 |
| 4,536,488 | 8/1985 | Wanke et al. | 502/159 |

FOREIGN PATENT DOCUMENTS 1063587  6/1976  Canada ................... 252/91

OTHER PUBLICATIONS

J. P. Butler, Separation Science and Technology, 15(3), 371 (1980).
J. P. Butler, J. H. Rolston, & W. H. Stevens, "Novel Catalysts for Isotopic Exchange Between Hydrogen and Liquid Water", ACS Symposium Series, No. 68, Separation of Hydrogen isotopes, Amer. Chem. Soc. (1978).
J. H. Rolston et al., "Catalysis on the Energy Scene", S. Kaliaguine and A. Mahay, editors, Elsevier Science Publishers (1984).
Flanigen et al., *Nature*, 271, 512 (1978).
K. Kunimori and coworkers, *Applied Catalysis*, 4, 67 (1982).

*Primary Examiner*—Carl F. Dees
*Attorney, Agent, or Firm*—Thomas K. McBride; Eugene I. Snyder

[57] ABSTRACT

Normal methods of impregnating silicalite with noble metals leads either to metal loadings under 8% at high (greater than 60%) dispersion or loading of over 8% noble metal at low dispersion. To obtain silicalite impregnated with a noble metal at more than 8 weight percent loading and with at least 60% dispersion it has been found necessary to pretreat the silicalite with a base and to impregnate the base treated silicalite with a noble metal compound in two stages separated by calcination. Platinized silicalite so prepared may be dispersed in a poly(tetrafluoroethylene) matrix and used as a fixed bed to catalyze isotopic exchange gaseous hydrogen and water vapor arising from a mass of liquid water flowing over the fixed catalyst bed.

14 Claims, No Drawings

NOBLE METAL EXCHANGE OF HYDROPHOBIC MOLECULAR SIEVES

FIELD OF THE INVENTION

The invention within relates to a method of producing hydrophobic molecular sieves which are highly loaded with at least one noble metal at high dispersions. Of particular interest is the preparation of silicalite having more than 8 weight percent of a noble metal, or a combination of noble metals, with at least 60% dispersion.

BACKGROUND OF THE INVENTION

The separation of hydrogen isotopes, especially the preparation of relatively pure heavy water, deuterium oxide ($D_2O$), is of great importance to the nuclear industry. Historically the Girdler-Sulfide process involving isotopic exchange between hydrogen sulfide and water has been by far the most important means for heavy water production. Although a process for separating hydrogen isotopes by isotopic exchange between hydrogen and water has important advantages over the Girdler-Sulfide process, the successful achievement of a water-based exchange process has remained an elusive goal. Recent developments have made such a process increasingly feasible and renewed hopes for its eventual use. Butler and coworkers have extensively reviewed recent progress in this area: J. P. Butler, *Separation Science and Technology*, 15(3), 371 (1980); Canadian Patent No. 1,063,587; J. P. Butler, J. H. Rolston, and W. H. Stevens, "Novel Catalysts for Isotopic Exchange Between Hydrogen and Liquid Water", ACS Symposium Series, No. 68, SEPARATION OF HYDROGEN ISOTOPES, American Chemical Society (1978); see also J. H. Rolston et al. in *Catalysis on the Energy Scene*, S. Kaliaguine and A. Mahay, editors, Elsevier Science Publishers (1984). Although we provide an abbreviated summary below, the interested reader should consult these references for more detailed information.

The exchange between gaseous hydrogen and liquid water is known to be catalyzed by many metals. The exchange rate of the overall process is limited by the solubility of hydrogen in water, since the exchange rate at the interface of phases is quite small. This solubility limitation has been circumvented by metal catalyzed vapor phase isotope exchange between hydrogen and water followed by vapor-liquid exchange between water where the two stages are physically separate to ameliorate the rapid deactivation of metal catalysts by liquid water, but the resulting process remained too expensive to be commercially competitive.

Using the same basic approach of metal catalyzed vapor phase isotope exchange between hydrogen and water followed by vapor-liquid exchange between water phases, the next development was that of hydrophobic catalysts. Because of their hydrophobic character these catalysts were not as prone to deactivation by liquid water as had been the prior art catalysts. The hydrophobic catalysts could be used as a fixed bed in a trickle bed operation with liquid water and the gaseous hydrogen flowing through the bed countercurrently, where isotope exchange occurred between hydrogen and the water vapor arising from the partial pressure of liquid water at the exchange temperature. Continued research at the Chalk River Nuclear Laboratory of Atomic Energy of Canada Limited led to successive improvements culminating in a catalyst of platinum and carbon "wetproofed" by bonding to poly(tetrafluoroethylene), (PTFE), where the hydrophobic PTFE layer prevents wetting of the catalyst surface in water.

Catalysts based on platinized carbon have the great disadvantage of being pyrophoric and combustible. What is needed is an active, noncombustible, hydrophobic, acid stable catalyst support with good thermal stability. Especially for the separation of hydrogen isotopes in the trickle bed process previously referred to, it is desirable that metal loading be at least 8 weight percent. However, merely having a high metal loading by itself is insufficient, for it is necessary to have good platinum dispersion, preferably as a monolayer (100% dispersion), but with at least 60% dispersion.

Silicalite is a hydrophobic molecular sieve having properties as a support quite well suited to the process under consideration. Wanke et al. in U.S. Pat. No. 4,536,488 have described platinum on silicalite catalysts for the isotope exchange in question and made several significant observations. Although they were able to prepare highly loaded (12%) platinum on silicalite, the exchange rates using this catalyst were significantly lower than platinized carbon with similar loading owing to a relatively low platinum dispersion on the silicalite support. This observation led the patentees to investigate different procedures for metal impregnation and they described a procedure affording highly dispersed (93-110%) platinum on silicalite with loadings at 5.9-7.4 weight percent platinum. A peculiar trait of their method, as shown by the data in their Table 3, is that platinum loading is virtually independent of the amount of platinum offered to the silicalite; increasing the amount of platinum offered by 8 fold increased the platinum loading only from 5.9 to 7.4 weight percent. Their data also permit the fair inference that a loading greater than 7.5 weight percent platinum is not possible by their method.

Our invention is a method of preparing catalytic composites of noble metals deposited on silicalite where the composite contains at least 8 weight percent of a noble metal, or some combination of noble metals, with at least 60% dispersion. Our invention affords a catalyst which is quite active in the aforementioned isotope exchange process and which has a high useful lifetime without being combustible or pyrophoric, thereby representing a significant advance in this art. In another aspect our invention is an improved isotope exchange process, where the improvement consists of the use of the catalyst of our invention.

SUMMARY OF THE INVENTION

The purpose of this invention is to prepare silicalite containing a noble metal at a concentration of at least 8 weight percent and with a dispersion of at least 60%. An embodiment comprises soaking silicalite with a caustic solution at 35°-60° C., impregnating the base-pretreated silicalite under basic conditions with a soluble noble metal compound, calcining the impregnated silicalite, and repeating the impregnation-calcination stages. In a more specific embodiment impregnation is performed at a pH between about 9.5 and 12.0. In a yet more specific embodiment the noble metal is platinum and calcination is performed at 300°-400° C. Another aspect of our invention is the use of a silicalite containing at least 8 weight percent platinum at a dispersion of at least 60% in a hydrogen isotope exchange process between hydrogen and water. Other embodiments will be apparent from the ensuing description.

DESCRIPTION OF THE INVENTION

We have observed that silicalite can be loaded with a noble metal, such as platinum, or a mixture of noble metals, to an amount greater than 8 weight percent only with great difficulty. Furthermore, when such highly loaded silicalite is prepared the platinum tends to agglomerate affording low (under 50%) dispersion of the metallic platinum. These observations required development of new procedures which afford silicalite having at least 8 weight percent, preferably at least 10 weight percent, of a noble metal with at least 60% dispersion and led to the instant invention. The features of our invention include both a base pretreatment and a double impregnation. That is, a single impregnation by a noble metal compound was insufficient to load the requisite amount of noble metal with at least 60% dispersion. Furthermore, it was found necessary to calcine the material between impregnations.

Silicalite is an unusual microporous crystalline silica which is hydrophobic and has uniform pore dimensions of about 6 Angstrom units and is described in U.S. Pat. No. 4,061,724. See also Flanigen et al., Nature, 271, 512 (1978). As was remarked upon previously, silicalite is highly desirable as a catalyst in the isotopic exchange of hydrogen in the hydrogen-water system.

As the first stage in our invention it is necessary to treat the silicalite with a base, in particular with a strong base. Aqueous solutions of alkali metal hydroxides are the most convenient strong bases to use, although quaternary ammonium hydroxides also may be utilized but not necessarily with equivalent results. The concentration of the strong base used and base treatment temperature and time must be such as to not dissolve a substantial amount of silicalite. The silicalite loss due to dissolution which is acceptable is somewhat arbitrary, and for the purposes of this invention we place the maximum loss at 30 percent. In practice, this means that aqueous solutions of strong base will be used that are between about 0.1 and 2 molar, most usually between 0.2 and 1.2 molar. Temperatures over 75° C. must be avoided for they lead to dissolution of the silicalite. Base treatment temperatures under about 10° C. also are to be avoided so that base treatment times do not become too long. Within the range of about 10° through about 75° C., a base treatment temperature between about 35° and about 60° C. generally is preferred. The time of the base treatment will depend on the concentration of the base solution as well as on the treatment temperature, and may range from several minutes to several hours. As a benchmark, when a 0.5 molar solution of sodium hydroxide is used at 50° C. it has been found that a treatment time of 1 hour is adequate.

After the silicalite has been treated with base it is mixed with an aqueous solution of a noble metal compound or a mixture of compounds. By noble metal is meant the Group VIII metals platinum, palladium, rhodium, ruthenium, osmium, and iridium, as well as rhenium gold, and any combination thereof. Among these the platinum group metals, which consist of platinum, palladium, rhodium, and ruthenium, are of particular interest, and for the isotopic hydrogen exchange process platinum is of especially high value.

The silicalite must be impregnated with the noble metal compound at a pH between 9.5 and 12. Therefore, one must use a noble metal compound which is both stable and soluble within this pH range. The prime examples of such compounds, using platinum for purposes of illustration only, include ammonia complexes such as $Pt(NH_3)_4X_2$, where X is halogen, and the corresponding amine complexes. As previously stated, impregnation is conducted such that the pH is between about 9.5 and 12 throughout the impregnation, with the pH range between about 9.5 and about 11 being somewhat favored. For convenience, impregnation generally is conducted in the range between 30° and 75° C., more particularly between about 35° and 60° C., for a time usually on the order of 0.5–8 hours. Because impregnation is done under basic conditions temperatures in excess of about 75° C. are discouraged. The solution of the noble metal compound is provided in an amount calculated to provide no more than about 7 weight percent of the noble metal based upon the amount of silicalite used for impregnation. Larger amounts of noble metal compound may be used but are without benefit, since no more than about 7 weight percent noble metal can be loaded onto the silicalite during the first impregnation.

After impregnation is complete the silicalite needs to be completely dried prior to the next impregnation. The silicalite most often is preliminarily dried, conveniently at a temperature of about 100° C. for several hours. Thereafter it is calcined at a temperature between about 250° and about 450° C. for 1 to 6 hours. Calcination temperatures above 450° C. are to be avoided since they lead to agglomeration of the metal on the silicalite. Calcination in the range from 300° to 400° C. for about 1 hour represents an acceptable yet convenient calcination condition. Calcination is not to be performed in a reducing atmosphere. Most often calcination is done in air, but an inert atmosphere and an oxidizing atmosphere, such as air enriched in oxygen, is quite acceptable. However, it should be apparent that air is by far the most convenient and therefore desirable calcination atmosphere.

After the first impregnation with a noble metal compound, the silicalite may contain up to about 7 weight percent of the noble metal. In order to obtain higher loading it is necessary to repeat the impregnation and calcination stages. The conditions for the second impregnation and calcination are the same as those for the initial stages. However, the noble metal compound may be the same or different from that used in the first impregnation, and the noble metal itself need not be the same as was used in the first impregnation. Just as is the case for the first impregnation, a mixture of noble metal compounds containing different noble metals also may be used in the practice of this invention.

Although the method of our invention may be used to prepare silicalite having one or more noble metals at a loading of at least 8 weight percent with at least 60% dispersion, its use in preparing silicalite having 8 weight percent of one or more noble metals with at least 80% dispersion is a preferred embodiment, and silicalite with at least 10 weight percent noble metals at 80% dispersion or greater is especially favored.

For use as a fixed bed in the isotopic exchange between gaseous hydrogen and gaseous water as provided by the vapor pressure of a flowing liquid water stream, the platinized silicalite as prepared by the method of this invention is desirably dispersed in a matrix of poly(tetrafluoroethylene). This has been amply described in the prior art (see, for example, U.S. Pat. No. 4,536,488) and will not be further discussed here.

The following examples merely serve to illustrate various aspects of our invention. The use of $Pt(NH_3)_4Cl_2$ in these examples is for convenience only and is representative of the platinum compounds which may be used and is also representative of the compounds of the noble metals which may be used, and must not be taken to restrict this invention in any way.

EXAMPLES

Silicalite was commercial material taken from inventory. Tetrammine platinous chloride was purchased from Johnson Matthey Inc. Both sodium hydroxide and ammonium hydroxide were reagent grade materials. The results of experiments and the value of variables used is indicated in the following table. All impregnations were performed using aqueous solutions of $Pt(NH_3)_4Cl_2$. The final calcined composite was analyzed for platinum dispersion by hydrogen chemisorption assuming one chemisorbed hydrogen atom per surface platinum atom. See, e.g., K. Kunimori and co-workers, *Applied Catalysis*, 4, 67 (1982).

silicalite at a temperature between about 250° and about 450° C. for a time from 1 to about 6 hours; (d) repeating stages (b) and (c); and recovering the resulting noble metal impregnated silicalite.

2. The method of claim 1 where the noble metal is selected from the group consisting of platinum, palladium, rhodium, ruthenium, osmium, iridium, rhenium, gold, or any combination thereof.

3. The method of claim 2 where the noble metal is selected from the group consisting of platinum, palladium, rhodium, ruthenium, or any combination thereof.

4. The method of claim 3 where the noble metal is platinum.

5. The method of claim 1 where the silicalite has at least 8 weight percent noble metal at a dispersion of at least 80%.

6. The method of claim 1 where the silicalite has at least 10 weight percent noble metal.

7. The method of claim 1 where the silicalite has at least 10 weight percent noble metal at a dispersion of at least 80%.

TABLE 1

Summary of Preparations of Platinized Silicalite[a]

| No. | Base Pretreatment | | | | Impregnation[d] | | | | Platinum Loading | |
|---|---|---|---|---|---|---|---|---|---|---|
| | Base | Conc.[b] | Temp | Time[c] | Amt[e] | ph | Temp | Time[c] | Weight Percent | Dispersion[f] |
| 1 | none | | | | 9 | — | 22 | — | 8.0 | 6.6 |
| 2 | NaOH | 0.1 | 50 | 0.5 | 14 | 9.4 | 50 | 1.0 | 4.5 | 72 |
| 3 | NaOH | 0.1 | 50 | 0.5 | 14 | 9.4 | 50 | 0.5 | 4.3 | 76 |
| 4 | NaOH | 0.1 | 50 | 1.0 | 7 | 9.4 | 50 | 1.0 | 4.6 | 70.2 |
| 5 | NaOH | 0.1 | 50 | 1.0 | 7 | 9.4 | 50 | 0.5 | 4.1 | 82.9 |
| 6[g] | NH$_4$OH | — | — | — | 8 | 11.6 | 22 | 1.0 | 0.52 | 49 |
| 7[g] | NH$_4$OH | — | — | — | 8 | 10.6 | 50 | 1.0 | 0.72 | 57.4 |
| 8 | NH$_4$OH | 30 | 50 | 1.0 | 14 | 9.9 | 50 | 3.5 | 1.2 | 65.1 |
| 9[h] | NaOH | — | — | — | 8 | 13 | 22 | 1.0 | 0.81 | 69.1 |
| 10[h] | NaOH | — | — | — | 8 | 12.1 | 50 | 1.0 | 2.10 | 80.7 |
| 11 | NaOH | 0.25 | 50 | 1.0 | 14 | 9.9 | 50 | 3.5 | 3.1 | 74.3 |
| 12 | NaOH | 0.5 | 50 | 1.0 | 14 | 9.7 | 50 | 3.5 | 5.7 | 81.7 |
| 15 | NaOH | 1.0 | 22 | 1.0 | 14 | 10.5 | 50 | 3.5 | 3.9 | — |
| 16 | NaOH | 1.0 | 50 | 1.0 | 14 | 10.3 | 50 | 3.5 | 5.5 | 83.3 |
| 17 | NaOH | 2.0 | 22 | 1.0 | 14 | 10.1 | 50 | 3.5 | 4.8 | 84.6 |
| 18 | NaOH | 2.0 | 50 | 1.0 | 14 | 10.2 | 50 | 3.5 | 5.7 | 89.5 |
| 19[i] | NaOH | 2.0 | 22 | 1.0 | 7 | 10.2 | 50 | 3.5 | 4.5 | 91 |
| 19[j] | NaOH | | | | 7 | 10 | 50 | 3.5 | 5.9 | 84.4 |

| No. | Base Pretreatment | | | | Impregnation[c] | | | | Platinum Loading | |
|---|---|---|---|---|---|---|---|---|---|---|
| | Base | Conc.[a] | Temp | Time[b] | Amt[d] | pH | Temp | Time[b] | Weight Percent | Dispersion[e] |
| 20[i] | NaOH | 2.0 | 50 | 1.0 | 7 | 10.2 | 50 | 3.5 | 4.8 | 94.3 |
| 20[j] | NaOH | | | | 7 | 9.95 | 50 | 3.5 | 6.4 | 90.9 |
| 21[i] | NaOH | 1.0 | 50 | 1.0 | 7 | 10.0 | 50 | 3.5 | 5.1 | 91.6 |
| 21[j] | NaOH | | | | 7 | 9.7 | 50 | 3.5 | 8.6 | 83.9 |
| 22[i] | NaOH | 0.5 | 50 | 1.0 | 7 | 10.5 | 50 | 3.5 | 6.4 | 58.1 |
| 22[j] | NaOH | | | | 7 | 10.5 | 50 | 3.5 | 11.6 | 60.3 |

[a]Except for sample 1, all samples were calcined by heating to 300° C. over 4 hours, then holding at 300° C. for 1 hour. For sample 1 heating was to 400° C.
[b]Concentration in molarity.
[c]Time is in hours.
[d]Impregnation was performed using aqueous solutions of $Pt(NH_3)_4Cl_2$.
[e]Assuming 100% absorbtion by silicalite, enough Pt is in solution to provide this weight percent Pt on silicalite.
[f]By chemisorbtion.
[g]Samples were exchanged and metal loaded in one step using NH$_4$OH for exchange and pH adjustment.
[h]Samples were exchanged and metal loaded in one step using NaOH for exchange and pH adjustment.
[i]First impregnation.
[j]Second impregnation.

What is claimed is:

1. A method of making silicalite having at least 8 weight percent noble metal thereon at a dispersion of at least 60% comprising: (a) pretreating the silicalite with a base by contacting the silicalite at a temperature from about 10° to about 75° C. with an aqueous solution of a strong base; (b) mixing the base pretreated silicalite with an aqueous solution of a noble metal compound at a pH from about 9.5 to about 12.0 at a temperature between about 30° and about 75° C.; (c) calcining in a non-reducing atmosphere the resulting noble metal impregnated 8. The method of claim 1 where the strong base is an alkali metal hydroxide at a concentration between about 0.1 to about 2.0 molar.

9. The method of claim 1 where the base pretreatment is performed at a temperature between about 35° and about 60° C.

10. The method of claim 1 where the base pretreated silicalite is mixed with a solution of a noble metal compound at a pH from 9.5 to 11.0.

11. A catalytic composite comprising a noble metal deposited on silicalite, said composite containing at least 8 weight percent of the noble metal at a dispersion of at least 60 percent, the noble metal being selected from the group consisting of platinum, palladium, rhodium, ruthenium, osmium, iridium, rhenium, gold, or any combination thereof.

12. The catalytic composite of claim 11 where the noble metal constitutes at least 10 weight percent of the composite.

13. The catalytic composite of claim 12 where the dispersion of the noble metal is at least 80 percent.

14. The catalytic composite of claim 11 where the composite contains at least 10 weight percent platinum at a dispersion of at least 80 percent.

* * * * *